US012764247B2

(12) United States Patent
Otani et al.

(10) Patent No.: US 12,764,247 B2
(45) Date of Patent: Oct. 13, 2026

(54) VIDEO OUTPUT APPARATUS AND METHOD, AND STORAGE MEDIUM

(71) Applicant: CANON KABUSHIKI KAISHA, Tokyo (JP)

(72) Inventors: Shota Otani, Kanagawa (JP); Tomohiro Ota, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/653,054

(22) Filed: May 2, 2024

(65) Prior Publication Data

US 2024/0388673 A1 Nov. 21, 2024

(30) Foreign Application Priority Data

May 15, 2023 (JP) ................................ 2023-080364

(51) Int. Cl.
*H04N 5/262* (2006.01)
*H04N 5/268* (2006.01)
*H04N 23/61* (2023.01)
*H04N 23/62* (2023.01)

(52) U.S. Cl.
CPC ........... *H04N 5/2628* (2013.01); *H04N 5/268* (2013.01); *H04N 23/61* (2023.01); *H04N 23/62* (2023.01)

(58) Field of Classification Search
CPC .... H04N 5/268; H04N 5/2628; H04N 23/633; H04N 23/632; H04N 23/61; H04N 23/69; H04N 23/67; H04N 23/815; H04N 23/62
See application file for complete search history.

(56) References Cited

U.S. PATENT DOCUMENTS 9,900,516 B2 * 2/2018 Jung ...................... H04N 23/61
2012/0062768 A1 * 3/2012 Arai ...................... H04N 23/611 348/E5.051
2020/0053288 A1 * 2/2020 Kim ...................... H04N 23/667
2020/0145583 A1 * 5/2020 Shanmugam ........ G06V 10/764
2022/0191406 A1 6/2022 Ikeda
2022/0360704 A1 11/2022 Nishio
(Continued)

FOREIGN PATENT DOCUMENTS

EP 2429175 B1 4/2016
JP 2005175683 A 6/2005
WO 2022071271 A1 4/2022

OTHER PUBLICATIONS

The Panasonic AW-UE100 instruction manual.
(Continued)

*Primary Examiner* — Kelly L Jerabek
(74) *Attorney, Agent, or Firm* — Cowan, Liebowitz & Latman, P.C.

(57) ABSTRACT

A video output apparatus comprises: a setting unit that is capable of setting a plurality of frames each indicative of partial video which is a part of input video; a selection unit that selects a subject according to an operation performed on the input video; an output unit that outputs video; and a control unit that performs control corresponding to the subject selected by the selection unit. In a case where the subject is selected under a state in which a plurality of frames are set, the output unit outputs partial video of a frame including the selected subject from among the plurality of set frames.

17 Claims, 13 Drawing Sheets

(56) References Cited

U.S. PATENT DOCUMENTS

2024/0205359 A1* 6/2024 Ota .................... H04N 5/2628

OTHER PUBLICATIONS

Partial English translation of the Panasonic AW-UE100 instruction manual.
The above patent documents was cited in a European Search Report issued on Sep. 26, 2024, that issued in the corresponding European Patent Application No. 24174801.1.

* cited by examiner

VIDEO OUTPUT APPARATUS AND METHOD, AND STORAGE MEDIUM

BACKGROUND OF THE INVENTION

Field of the Invention

The present invention relates to a video output apparatus and method, and storage medium, and particularly relates to a technique for selecting and outputting a partial region of video shot by one image capturing unit.

Description of the Related Art

A cropping function in video equipment is a function that cuts out a partial region from the entire input video and outputs it. By making the cropping range changeable, the composition and angle of view of the output video can be changed without performing panning, tilting, or zooming operations on a camera which is an input source.

Japanese Patent Laid-Open No. 2005-175683 discloses a digital camera that can obtain partial images of a plurality of areas from a captured image at the same time when the image is captured. Additionally, the Panasonic UE-AW100 instruction manual discloses a camera that can set up to three areas in input video as crop candidates, and crop and output one area selected out of the three areas.

Focus control in a camera is to control the position of a lens so that a subject at a predetermined distance from an image capturing unit is brought into focus. When a plurality of cropping areas are set in video captured by a single image capturing unit, it is impossible to focus on the main subjects in all of these cropping areas unless all the main subjects are located at the same distance from the image capturing unit.

Therefore, it is practical to select one priority area from among the plurality of cropping areas and focus on the main subject in the priority area. However, when changing the priority area, even if the AF is controlled to follow the changing priority area, for example, in a case where the changed priority area includes multiple subjects, a subject that the user desires to focus on may not be always determined and focused correctly in the changed priority area. Therefore, after performing an operation to change the priority area, the user is required to at least check the focus state of the changed area, and perform further focus operations as necessary.

In order to minimize the time during which the focus state becomes unstable upon changing the priority area, it is necessary to perform the above operations sequentially and promptly, which is a heavy burden on the user. Furthermore, in the case of a system in which the image capturing unit that performs focus control and the switcher unit that selects the priority area are separate units, it is difficult to perform the above operations sequentially and promptly.

The above-mentioned problem is the same not only in focus control but also in exposure control, white balance control, image processing control, etc. in which control contents are also determined based on the main subject.

SUMMARY OF THE INVENTION

The present invention has been made in consideration of the above situation, and makes it easier and faster to select the priority area and subject.

According to the present invention, provided is a video output apparatus comprising one or more processors and/or circuitry which function as: a setting unit that is capable of setting a plurality of frames each indicative of partial video which is a part of input video; a selection unit that selects a subject according to an operation performed on the input video; an output unit outputs video; and a control unit performs control corresponding to the subject selected by the selection unit, wherein, in a case where the subject is selected under a state in which a plurality of frames are set, the output unit outputs partial video of a frame including the selected subject from among the plurality of set frames.

Further, according to the present invention, provided is a video output apparatus comprising one or more processors and/or circuitry which function as: a display control unit that displays a plurality of input videos on display means; a selection unit that selects a subject according to an operation performed on the input videos; an output unit that outputs video including the subject selected by the selection unit; and notifying means that notifies information about the subject selected by the selection unit to an input source of the video including the selected subject.

Furthermore, according to the present invention, provided is a video output method comprising: a setting step of setting at least one frame indicative of partial video which is a part of input video; a selection step of selecting a subject according to an operation performed on the input video; an output step of outputting video; and a control step of performing control corresponding to the subject selected by the selection mean, wherein, in a case where the subject is selected under a state in which a plurality of frames are set in the setting step, in the output step partial video of a frame including the selected subject is output from among the plurality of set frames.

Further, according to the present invention, provided is a video output method comprising: a display control step of displaying a plurality of input videos on display means; a selection step of selecting a subject according to an operation performed on the input videos; an output step of outputting video including the subject selected in the selection step; and a notifying step of notifying information about the subject selected in the selection step to an input source of the video including the selected subject.

Further, according to the present invention, provided is a non-transitory computer-readable storage medium, the storage medium storing a program that is executable by the computer, wherein the program includes program code for causing the computer to function as a video output apparatus comprising: a setting unit that is capable of setting a plurality of frames each indicative of partial video which is a part of input video; a selection unit that selects a subject according to an operation performed on the input video; an output unit outputs video; and a control unit performs control corresponding to the subject selected by the selection unit, wherein, in a case where the subject is selected under a state in which a plurality of frames are set, the output unit outputs partial video of a frame including the selected subject from among the plurality of set frames.

Further, according to the present invention, provided is a non-transitory computer-readable storage medium, the storage medium storing a program that is executable by the computer, wherein the program includes program code for causing the computer to function as a video output apparatus comprising: a display control unit that displays a plurality of input videos on display means; a selection unit that selects a subject according to an operation performed on the input videos; an output unit that outputs video including the subject selected by the selection unit; and notifying means that notifies information about the subject selected by the selection unit to an input source of the video including the selected subject.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5C-1 and 5C2 illustrate a flowchart of focus control and crop frame selection processing of an output target in the first embodiment.

DESCRIPTION OF THE EMBODIMENTS

Figure 1:
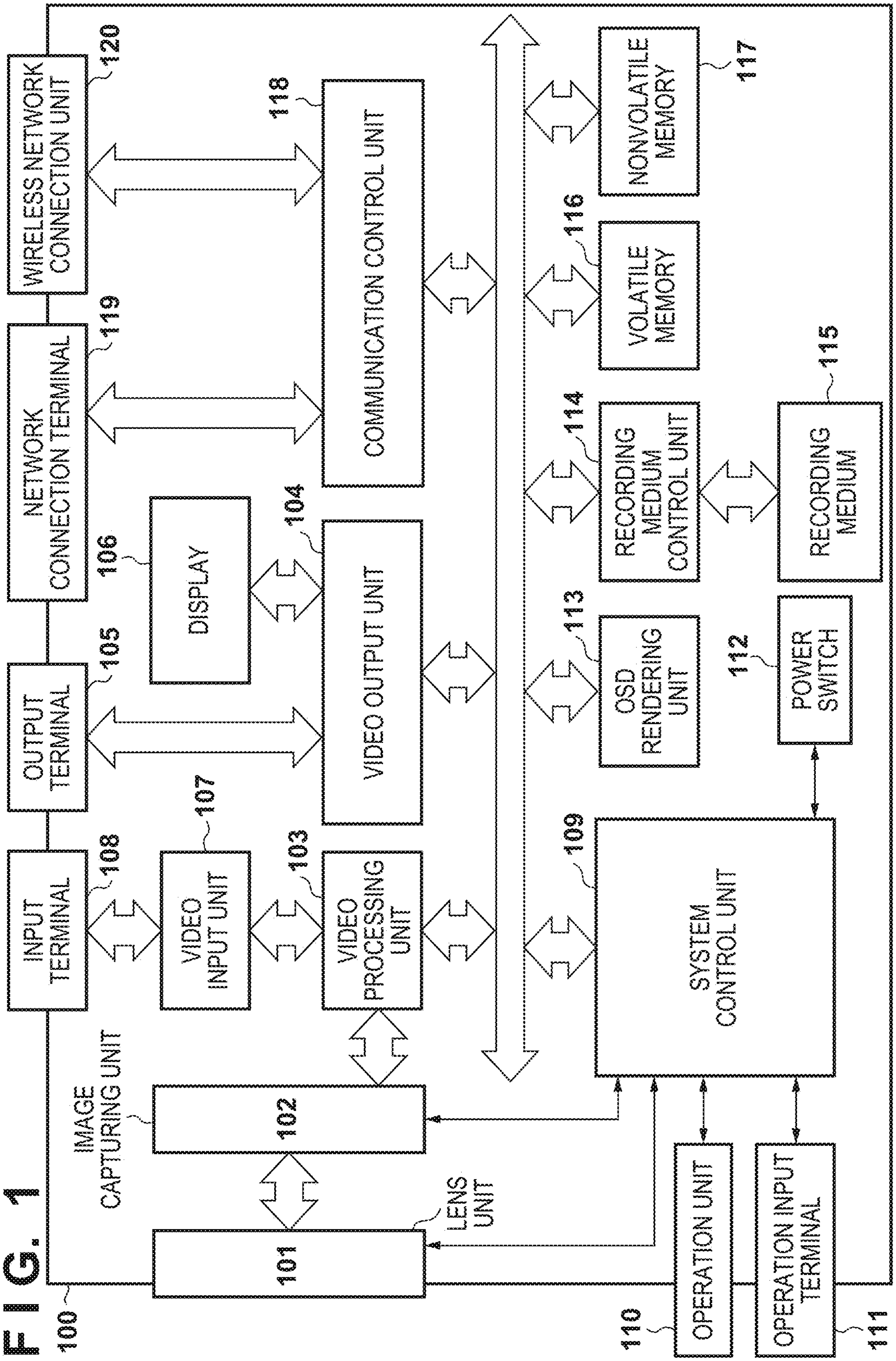
FIG. 1 is a block diagram illustrating a configuration of a camera according to a first embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram illustrating the configuration of a camera 100 as an example of an image capturing apparatus according to the first embodiment.

A lens unit 101 includes a focus mechanism, a zoom mechanism, an aperture, and an image stabilization mechanism, and performs lens control such as focus lens actuation, zoom actuation, aperture actuation, and image stabilization lens actuation based on control commands received from a system control unit 109. The lens unit 101 may be built into the camera 100, or may be an external lens attached to the camera 100 via a lens mount (not shown).

An image capturing unit 102 includes an image sensor that converts an optical image focused by the lens unit 101 into an electrical signal, and an A/D converter that converts an analog signal into a digital signal. The image sensor captures images at a predetermined frame rate.

A video processing unit 103 inputs video data at a predetermined frame rate from the image capturing unit 102 or a video input unit 107, and performs predetermined resizing processing, trimming processing, color conversion processing, subject distance calculation processing, and distortion correction processing. The processed video data is then stored as a full-angle video using a volatile memory 116 as a VRAM. Alternatively, RAW data before undergone the above image processing can be output to the volatile memory 116.

In addition, the video processing unit 103 performs predetermined calculation processing using the video data obtained from the image capturing unit 102, and the system control unit 109 performs exposure control, focus adjustment control, image stabilization control and AWB (auto white balance) control based on the obtained calculation results. The predetermined calculation processing also includes processing for detecting a subject such as a face. As a result, AF (autofocus) processing, AE (automatic exposure) processing, image stabilization processing, and AWB processing are executed.

Furthermore, the video processing unit 103 can also generate a partial video cropped from the full-angle video in a range determined by coordinates based on instructions from the system control unit 109. Furthermore, the video processing unit 103 can resize the cropped partial video to have a resolution suitable to be output from a video output unit 104.

An OSD rendering unit 113 renders character strings and icons representing the status and settings of the camera 100, menu screens, etc. to a VRAM of the volatile memory 116. Characters and icons are stored in a nonvolatile memory 117, and the OSD rendering unit 113 reads them out and renders them to the VRAM.

The video output unit 104 reads the video data recorded in the volatile memory 116 and the data rendered by the OSD rendering unit 113 as necessary, superimposes them, converts the result into a video signal, and sends it to respective systems of an output terminal 105, display 106, and communication control unit 118. Alternatively, RAW data may be output to the output terminal 105 as is. The video output unit 104 also has a role of converting the accompanying information received from the system control unit 109 into metadata and outputting it to the output terminal 105 together with the video. Metadata can be linked to video data for each frame, and can express accompanying information for each frame, such as a time code.

The output terminal 105 is for outputting video to an external device, and can output a video signal to an external monitor and recording device connected via an HDMI (registered trademark) cable, SDI cable (both are not shown), and so forth. The metadata output from the video output unit 104 can also be output to external devices via the respective cables.

The display 106 is configured by, for example, an LCD panel, and its display is controlled by the video output unit 104, and mainly displays video obtained by superimposing data drawn by the OSD rendering unit 113 on video data processed by the video processing unit 103.

The video input unit 107 can input a video signal equivalent to the video captured by using the lens unit 101 and the image capturing unit 102 from the outside via an input terminal 108. Therefore, by omitting the lens unit 101 and the image capturing unit 102, the camera 100 can be regarded as an effector apparatus that only performs video input/output and processing, and the present invention can also be applied in that case.

The input terminal 108 is for inputting video from an external device, and is composed of an HDMI terminal, an SDI terminal, and the like.

The system control unit 109 controls the camera 100 as a whole. The system control unit 109 controls each part by reading out programs recorded in the nonvolatile memory 117 and executing them, thereby realizes each operation of this embodiment. The system control unit 109 may include multiple CPU cores. In that case, the tasks described in the programs can be shared and processed by the multiple CPU cores. The system control unit 109 also includes a system timer for performing timing control of each process.

An operation unit 110 includes a menu key, a cross key, a touch panel, and so forth for operating a menu screen on the video displayed on the display 106 and selecting a range of cropped video (partial video) to be described later. The touch panel is configured integrally with the display 106 and can issue various instructions by detecting user operations such as tapping or dragging on the subject and elements displayed on the display 106.

An operation input terminal 111 is for controlling the camera 100 from an external controller, and the system control unit 109 is notified of a control signal via the operation input terminal 111. By the system control unit 109 detecting the content of the operation based on the control signal, the user can perform similar operation to that performed by using the operation unit 110.

A power switch 112 is for selecting the power state of the camera 100, and depending on the position of the switch, determines whether the power is on or off, and notifies the system control unit 109 of the determined state.

A recording medium 115 such as an HDD or an SSD is connected to a recording medium control unit 114 which reads out data from the recording medium 115 and writes data to the recording medium 115. The recording medium 115 is typified by an HDD, SSD, or the like, and records video and metadata accompanying it. The recording medium 115 may be a removable nonvolatile memory such as an SD card which is connected via a socket (not shown) or the like.

The volatile memory 116 is used as a dynamic memory area for video data or RAW data handled by each of the video processing unit 103, video output unit 104, and OSD rendering unit 113, and for programs used by the system control unit 109. Furthermore, the volatile memory 116 has a storage capacity sufficient to store moving images for a predetermined period of time.

The nonvolatile memory 117 is a memory from/to which data can be electrically erased and recorded, such as an EEPROM. In the nonvolatile memory 117, constants, programs, etc. used for the operation of the system control unit 109 are recorded. Note that the programs mentioned here include programs for executing processes corresponding to the flowcharts described later in this embodiment.

The communication control unit 118 is used to communicate with external devices. By using either or both of a network connection terminal 119 and a wireless network connection unit 120, wireless/wired IP communication is possible. The communication control unit 118 enables monitoring of video via IP communication by transmitting the video from the video output unit 104 to an external device. Further, by receiving a control signal generated by operating an external controller, an operation request corresponding to an operation executable by the operation unit 110 can be notified to the system control unit 109. Alternatively, a setting change request for directly changing setting items on a menu screen displayed on the display 106 can be received and notified to the system control unit 109.

The network connection terminal 119 is for performing wired network communication by the communication control unit 118, and the wireless network connection unit 120 is for performing wireless network communication by the communication control unit 118. The wireless network connection unit 120 may have a structure to connect to a detachable antenna such as a WiFi dongle, for example, via a socket (not shown) or the like.

Figure 2A:
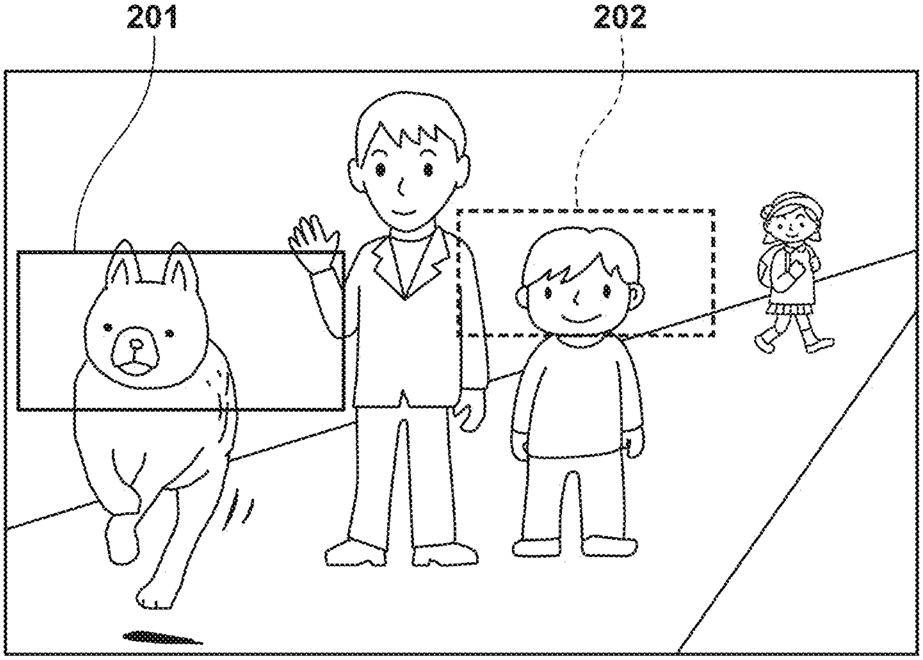
FIGS. 2A and 2B illustrate examples of video displayed on a screen according to the first embodiment.

FIG. 2A shows an example of a video displayed on the display 106 or an external controller when generating partial video from full-angle video captured by the video processing unit 103 by cropping an area determined by coordinates based on instructions from the system control unit 109. The display 106 can display full-angle video after being enlarged or reduced with a predetermined area as a reference.

A cropping frame 201 indicates an area of cropped video (partial video) that is being output to the output terminal 105. Further, a cropping frame 202 indicates an operation target, and the video in the cropping frame 202 is not output to the output terminal 105. Note that the number of cropping frames to be set is not limited to two, and may be set arbitrarily by the user. When a plurality of cropping frames are set, the camera 100 can output to the output terminal 105 cropped video in the range of at least one cropping frame among the plurality of cropping frames. The cropping frame that indicates an area of cropped video that is being output to the output terminal 105 and the cropping frame that indicates an area of video that is not output to the output terminal 105 may be displayed in different display formats, such as solid lines and dotted lines, and different frame colors.

Figure 2B:
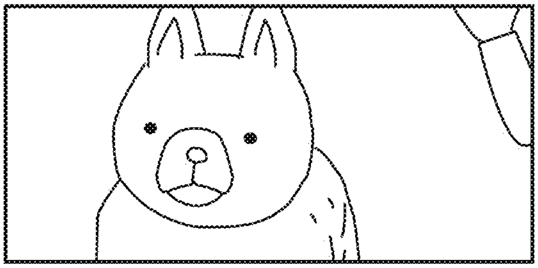

FIG. 2B illustrates an example of cropped video output from the output terminal 105 when the cropping frame 201 and the cropping frame 202 are set in the state as shown in FIG. 2A.

Figure 3:
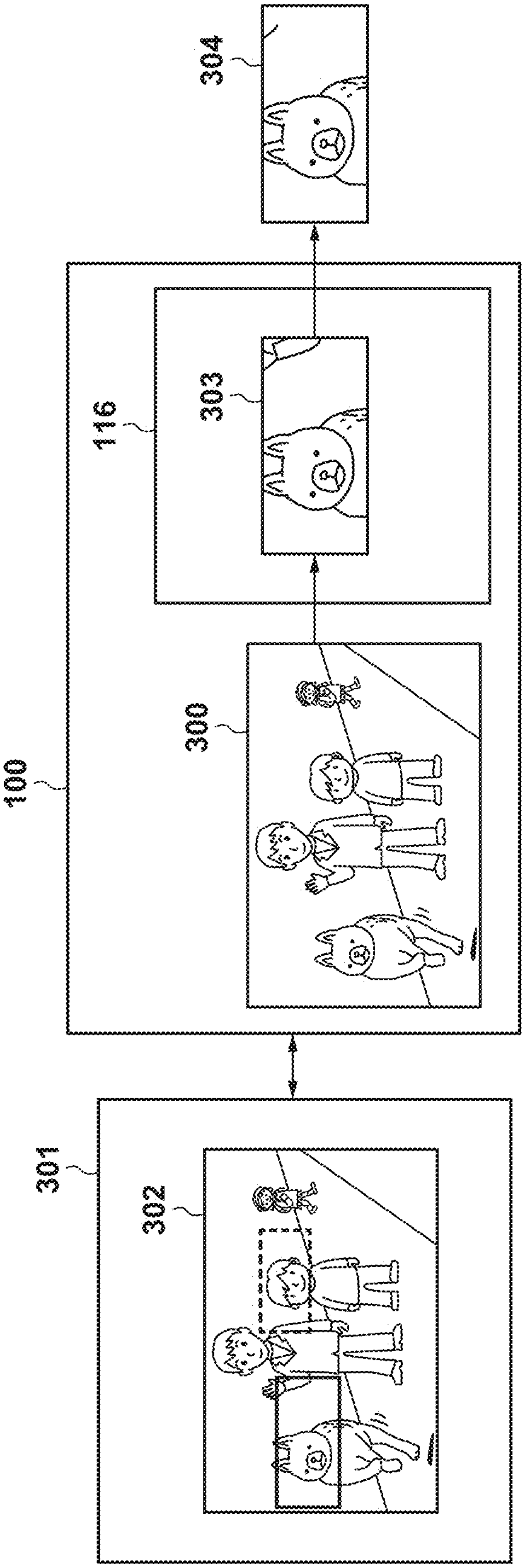
FIG. 3 is a diagram illustrating examples of video according to the first embodiment.

FIG. 3 is a diagram illustrating the video data handled by the camera 100 and the video displayed on the display 106 or an external controller when the camera 100 outputs video data 304.

Full-angle video data 300 is input from the image capturing unit 102 or the video input unit 107 to the video processing unit 103. A reference numeral 301 indicates an external controller or the display 106, and a reference numeral 302 indicates an example of video displayed on those display units.

Video data 303 is data of cropped video that has been cropped and resized by the video processing unit 103 so as to be output from the output terminal 105 and is stored in the VRAM of the volatile memory 116. The video data 303 stored in the VRAM of the volatile memory 116 can be output to the outside as video output from the output terminal 105, the network connection terminal 119, and the wireless network connection unit 120. Furthermore, the video data 303 can be recorded on the recording medium 115.

Video data 304 is output to the outside as video output from the output terminal 105, the network connection terminal 119, and the wireless network connection unit 120.

Figure 4:
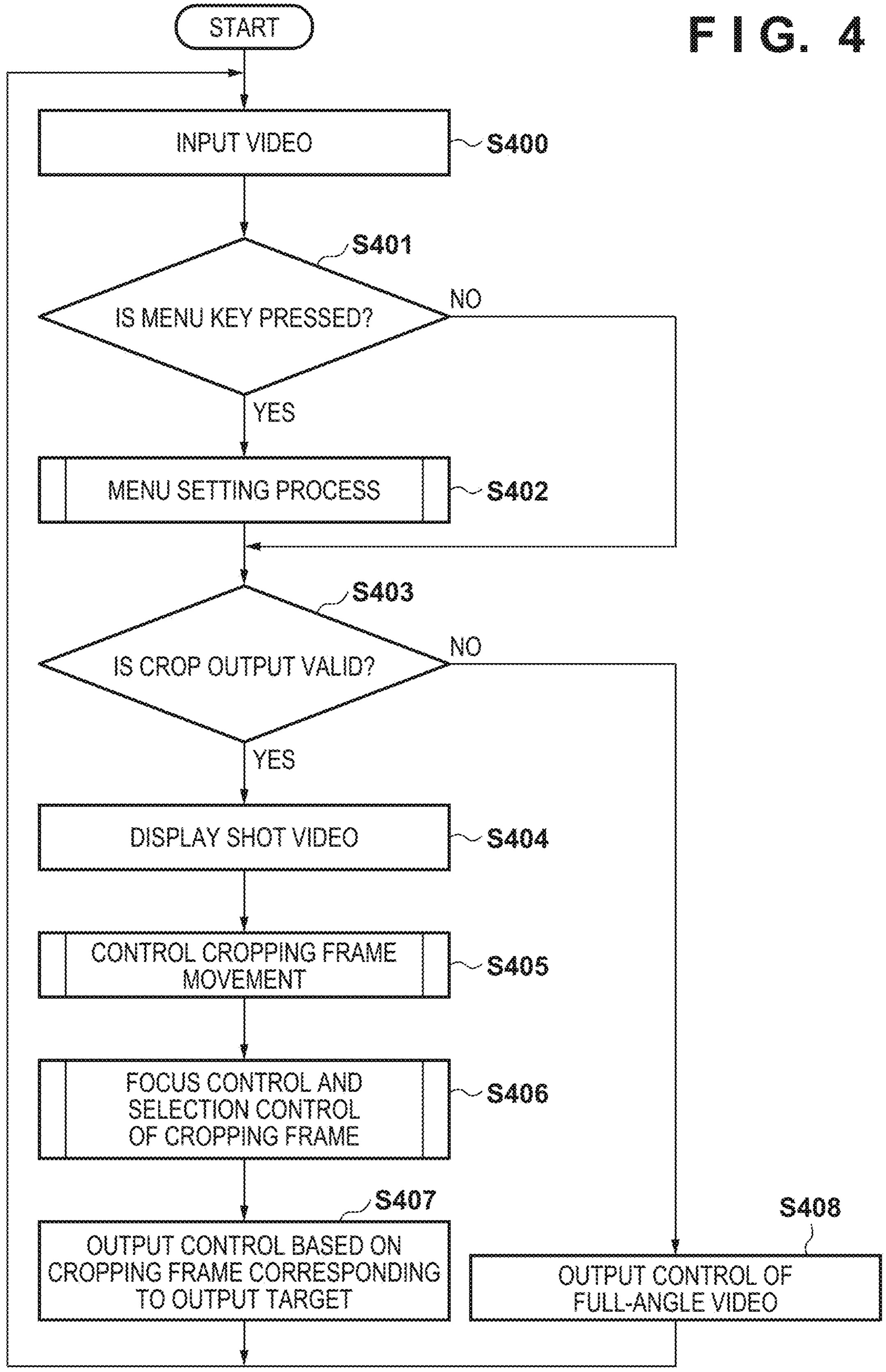
FIG. 4 is a flowchart illustrating an operation of the camera according to the first embodiment.

FIG. 4 is a flowchart showing an example of the operation of the camera 100 according to this embodiment. The processing of this flowchart and the processing of sub-flowcharts called from this flowchart are realized by the system control unit 109 controlling each part of the camera 100 based on a program stored in the nonvolatile memory 117. Further, user operations that occur in the processing of this flowchart and sub-flowcharts occur when the system control unit 109 detects an operation performed by the user on the operation unit 110. Alternatively, as shown in FIG. 3, the user operations may occur by the system control unit 109 detecting a control signal received from the operation input terminal 111 or the communication control unit 118 issued by using an external controller.

When the processing starts, video is input in step S400. Note that the video input here may be video shot by the image capturing unit 102 or video input from the input terminal 108 via the video input unit 107.

Next, in step S401, it is determined whether a menu key is pressed. If the menu key is pressed, the process advances to step S402; if the menu key is not pressed, the process advances to step S403.

In step S402, a menu setting process is performed. Note that details of the process in step S402 will be described later with reference to the flowchart shown in FIG. 5A.

In step S403, the menu settings stored in the volatile memory 116 are read out, and it is determined whether crop output is set as valid. If the crop output is set as valid, the process advances to step S404, and if the crop output is not set as valid, the process advances to step S408.

In step S408, the video output unit 104 is controlled to output full-angle video.

On the other hand, in step S404, a video as shown in FIG. 2A is displayed. The video displayed here is obtained by superimposing the data drawn in the VRAM of the volatile memory 116 by the OSD rendering unit 113 on the full-angle video stored in the volatile memory 116 and displaying the data on the display 106. Alternatively, it may be configured such that logical information for displaying the video as shown in FIG. 2A is to be displayed on an external display device via the network connection terminal 119 or the wireless network connection unit 120.

Then, in step S405, control of moving the cropping frame is performed. The details of the control in step S405 will be described later with reference to the flowchart in FIG. 5B.

In step S406, focus control and selection control of a cropping frame of output target (i.e., the cropping frame surrounding partial video to be output) are performed. Note that details of the controls in step S406 will be described later with reference to the flowchart in FIGS. 5C-1 and 5C-2.

In step S407, information on the cropping frame of output target selected in step S406 is read out from the volatile memory 116, and based on this, the video output unit 104 is controlled to crop full-angle video output from the video processing unit 103 as shown in FIG. 2B, and output the clopped video. It should be noted that if it is determined in step S406 that the full-angle video is to be output, the full-angle video is output without performing cropping process.

Figure 5A:
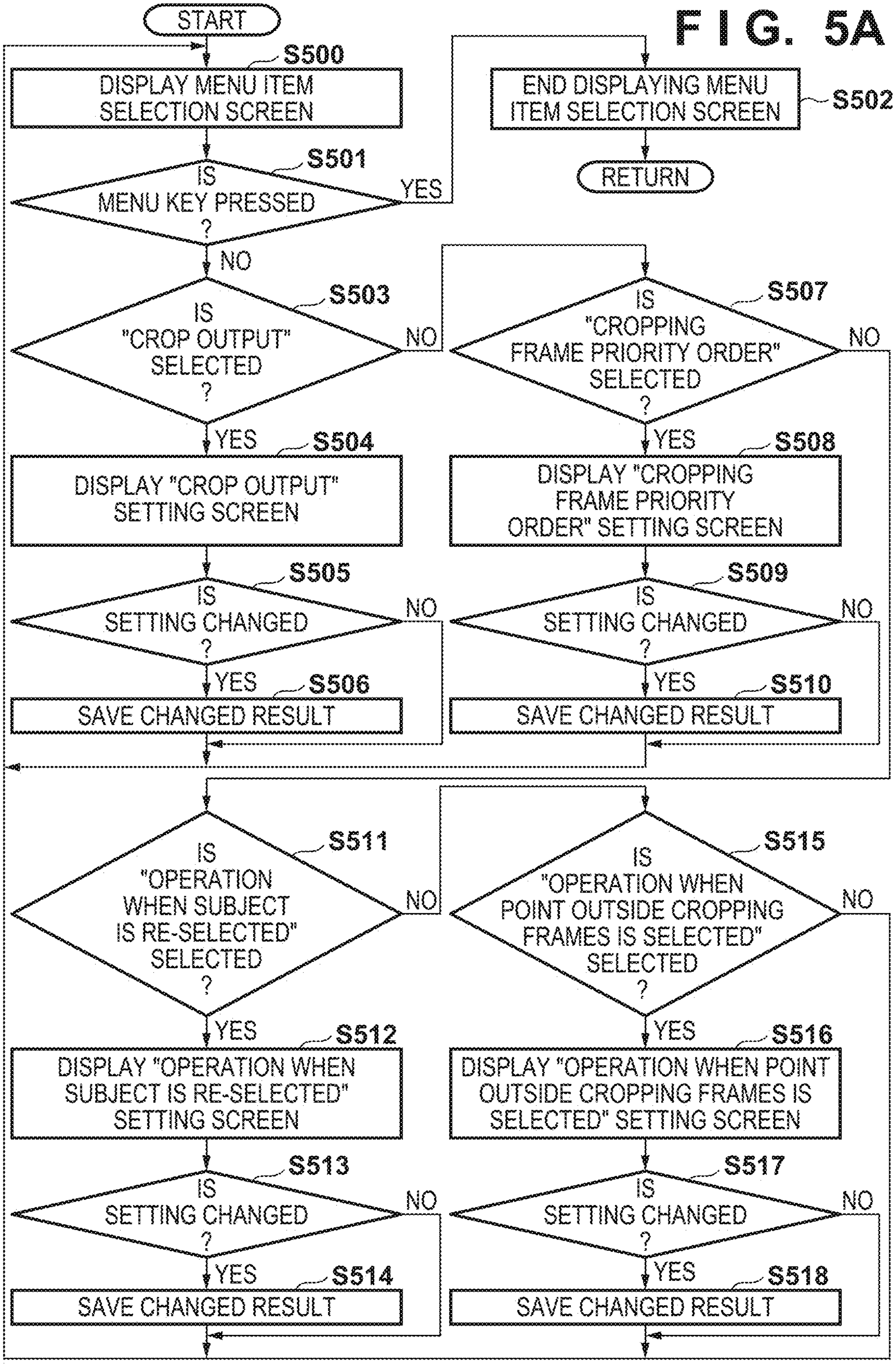
FIG. 5A is a flowchart of a menu setting process in the first embodiment.

FIG. 5A is a flowchart showing the menu setting process performed in step S402 in FIG. 4.

Figure 6A:
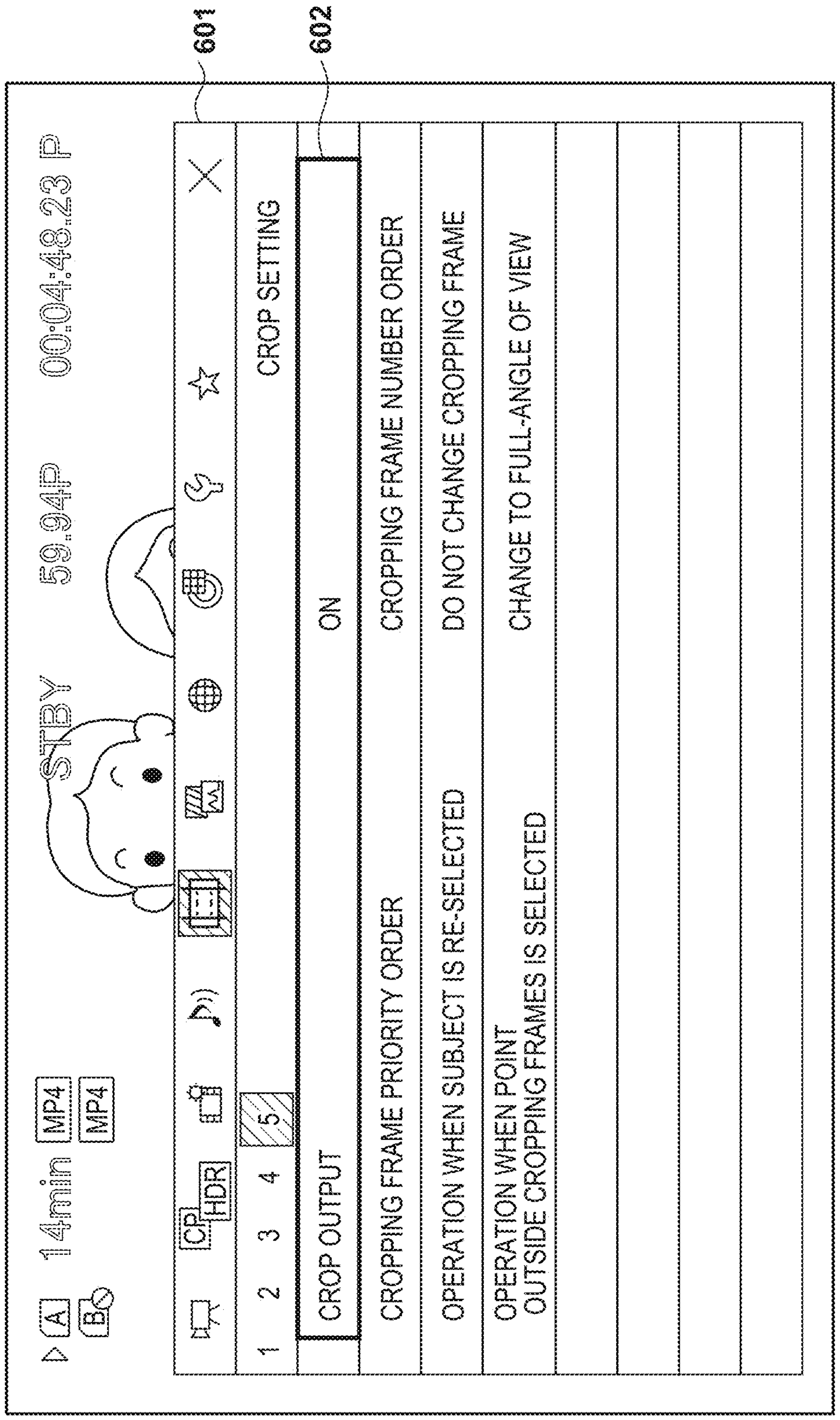
FIGS. 6A and 6B are diagrams illustrating an example of a menu display according to the first embodiment.

At step S500, a menu item selection screen shown in FIG. 6A is displayed. The selection screen can be realized by displaying on the display 106 a menu screen rendered on the VRAM of the volatile memory 116 by the OSD rendering unit 113. Further, it may be configured such that logical information for displaying the menu screen is displayed on an external display device via the network connection terminal 119 or the wireless network connection unit 120. Reference numeral 601 denotes a menu display in which setting items are arranged in a line. Reference numeral 602 denotes a cursor display indicating the selected state of a setting item, and the cursor can be moved to another setting item by up/down operation on the operation unit 110 or touch panel operation.

In step S501, it is determined whether a menu key is pressed. If the menu key is pressed, the process advances to step S502; if the menu key is not pressed, the process advances to step S503.

In step S502, the menu item selection screen is ended and the process returns to the process of FIG. 4.

On the other hand, in step S503, it is determined whether "crop output" is selected from among the menu items. "Crop output" is an item for setting whether or not to use a crop output function in camera 100. The "crop output" setting consists of two options: "on" and "off." If it is "on", a cropping frame or frames are displayed on the display 106. If "crop output" is selected, the process advances to step S504, and if it is not selected, the process advances to step S507.

Figure 6B:
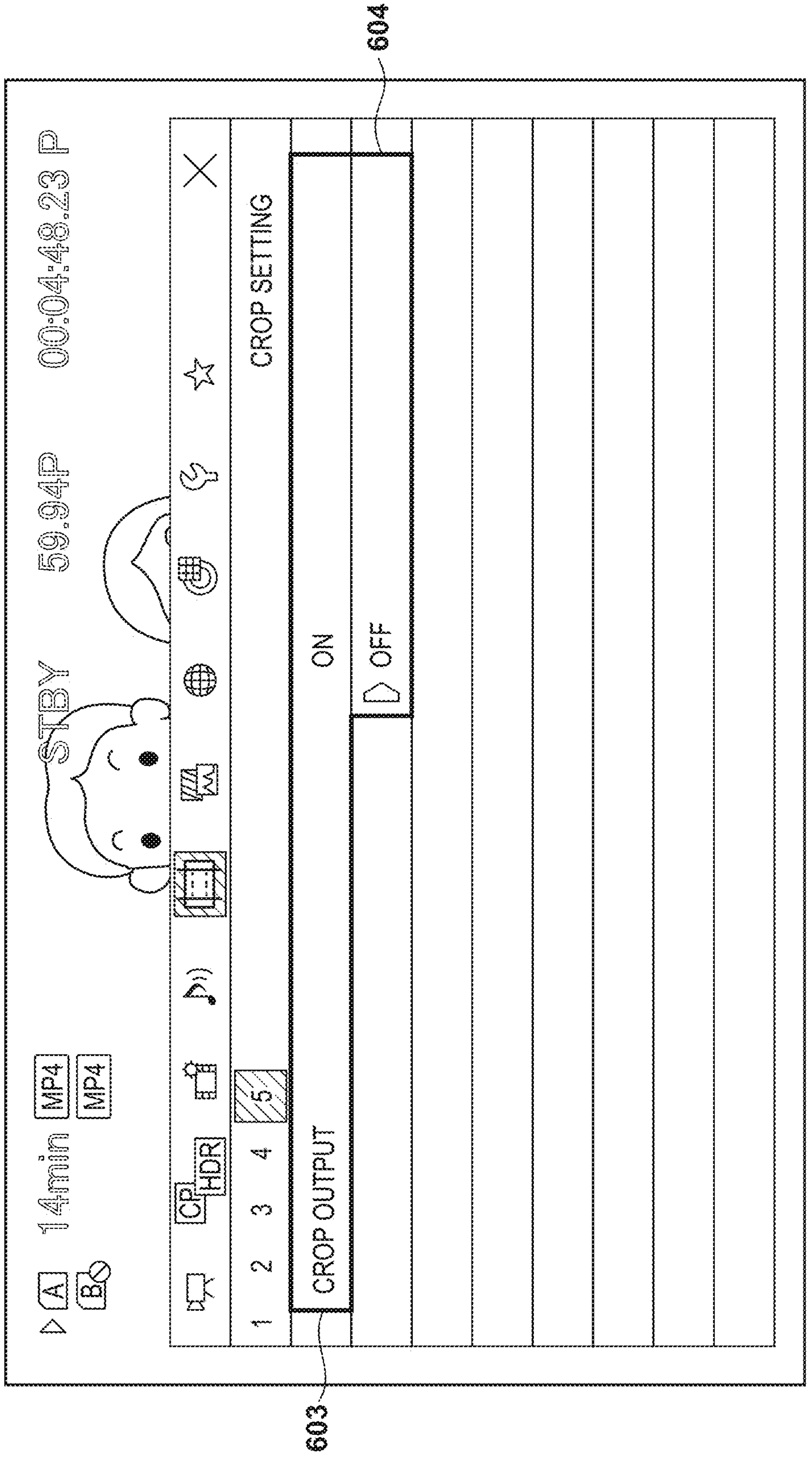

In step S504, a setting screen for "crop output" shown in FIG. 6B is displayed. In FIG. 6B, reference numeral 603 indicates the item being set, and reference numeral 604 indicates a cursor indicating the selected state of a setting. The cursor 604 can be moved to other settings by up and down operations on the operation unit 110 or an operation on a touch panel.

In step S505, it is determined whether a setting of "crop output" is changed, and if the setting is changed, the process advances to step S506, and if the setting is not changed, the process returns to step S500.

In step S506, the result changed in step S505 is saved in the volatile memory 116, and the process returns to step S500.

In step S507, it is determined whether "cropping frame priority order" is selected from the menu items. If "cropping frame priority order" is selected, the process advances to step S508, and if not, the process advances to step S511. The "cropping frame priority order" is used to set a method for determining the priority order of cropping frames in a case where a subject is selected in a process described later and the subject exists in a plurality of cropping frames. By providing this setting, the user can select the priority determination method depending on the shooting situation. Examples of selectable items include the following:

- "Cropping frame number order": The priority order is determined based on the number given in advance to each cropping frame. According to this setting, the cropping frame to be prioritized is determined in advance, making it easier for the user to predict the selection result in advance.
- "Selection history order": Preferentially select cropping frames that have been used more recently. With this setting, a desirable frame can be selected and output based on the cropping history.
- "Distance order": Prioritize a cropping frame whose center coordinates is closer to the coordinates obtained by the operation for selecting the subject. With this setting, it is possible to derive the priority order that the user would consider desirable based on the distance, and determine the cropping frame of output target.

In step S508, a setting screen for "Cropping frame priority order" is displayed. Here, for example, options are displayed that indicate the method for determining the priority order of cropping frames, such as the above-mentioned "Cropping frame number order", "Selection history order", and "Distance order". The user can select a desired determination method by moving the cursor by up and down operations on the operation unit 110 or an operation on a touch panel.

In step S509, it is determined whether the setting of "cropping frame priority order" is changed. If the setting is changed, the process advances to step S510, and if it is not changed, the process returns to step S500.

In step S510, the results changed in step S509 are saved in the volatile memory 116, and the process returns to step S500.

In step S511, it is determined whether or not "Operation when subject is re-selected" is selected from the menu items. If "Operation when subject is re-selected" is selected, the process advances to step S512, and if not, the process advances to step S515. "Operation when subject is reselected" is an item for, after a subject existing in a plurality of cropping frames has been selected once, setting the operation when the same subject is reselected. Examples of selectable items include the following:

"Do not change cropping frame": The cropping frame of output target will not be changed even if a reselection operation is performed. For ambiguous operations such as selecting a subject existing in a plurality of cropping frames, maintaining the current state is prioritized without unnecessarily switching the cropping frame of output target.

"Change cropping frame": When a reselection operation is performed, the cropping frame of output target is changed to the cropping frame with the next highest priority. It is possible to proactively consider ambiguous operations such as selecting a subject that exists in a plurality of cropping frames, and prioritize changing the cropping frame of output target.

In step S512, a setting screen for "Operation when subject is reselected" is displayed. Here, for example, the above-mentioned options of "Do not change cropping frame" and "Change cropping frame" are displayed. The user can select either of the options by moving the cursor by up and down operations on the operation unit 110 or an operation on a touch panel.

In step S513, it is determined whether the setting of "Operation when subject is reselected" is changed. If it is changed, the process advances to step S514, and if it is not changed, the process returns to step S500.

In step S514, the result changed in step S513 is saved in the volatile memory 116, and the process returns to step S500.

In step S515, it is determined whether "Operation when point outside cropping frames is selected" is selected from the menu items, and if "Operation when point outside cropping frames is selected" is selected, the process advances to step S516, and if not, the process returns to step S500. "Operation when point outside cropping frames is selected" is an item for setting the operation when a subject that does not belong to any cropping frame is selected. By providing "Operation when point outside cropping frames is selected," the user can choose whether to prioritize preventing erroneous operations or switching to full-angle video. Examples of selectable items include the following:

"Do not change": Even if a selection operation is performed, the cropping frame of output target and focus control criteria will not be changed. It is possible to avoid undesired video from being output in a case where a point of an area outside the cropping frames is selected due to an erroneous operation.

"Change to full-angle of view": Full-angle of view is determined as the output target. The operation for switching to full-angle video can be performed naturally by a method similar to the operation for changing the cropping frame of output target.

In step S516, a setting screen for "Operation when point outside cropping frames is selected" is displayed. Here, for example, the above-mentioned options of "Do not change" and "Change to full-angle of view" are displayed. The user can select either of the options by moving the cursor by up and down operations on the operation unit 110 or an operation on a touch panel.

In step S517, it is determined whether the setting of "Operation when point outside cropping frames is selected" is changed, and if it is changed, the process advances to step S518, and if it is not changed, the process returns to step S500.

In step S518, the result changed in step S517 is saved in the volatile memory 116, and the process returns to step S500.

Figure 5B:
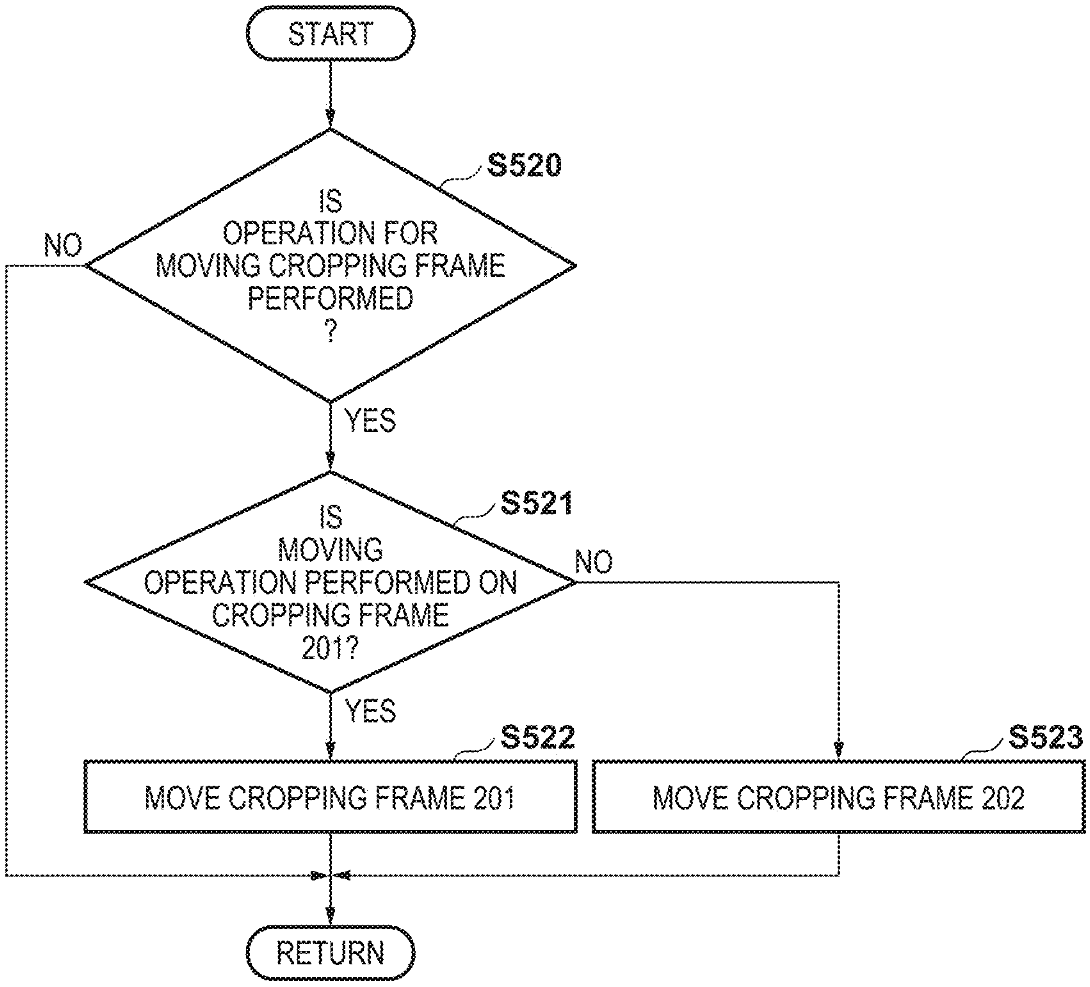
FIG. 5B is a flowchart of control of moving a cropping frame in the first embodiment.

FIG. 5B is a flowchart of the control of moving the cropping frame performed in step S405 of FIG. 4.

In step S520, it is determined whether an operation for moving the cropping frame is performed. The moving operation occurs, for example, by operating a cross key included in the operation unit 110 or by dragging operation on a touch panel. If a moving operation is performed, the process advances to step S521, and if it is not performed, the process returns to the process of FIG. 4.

In step S521, it is determined whether the target on which the moving operation was performed in step S520 is the cropping frame of output target. In the example shown in FIG. 2A, this corresponds to the cropping frame 201. If the moving operation is performed on the cropping frame 201, the process advances to step S522, where the cropping frame 201 is moved in the direction corresponding to the moving operation, and then the process returns to the process of FIG. 4.

If the moving operation is not performed on the cropping frame 201, the cropping frame 202 is moved in the direction corresponding to the moving operation in step S523, and then the process returns to the process of FIG. 4.

Figures 1, 5C:
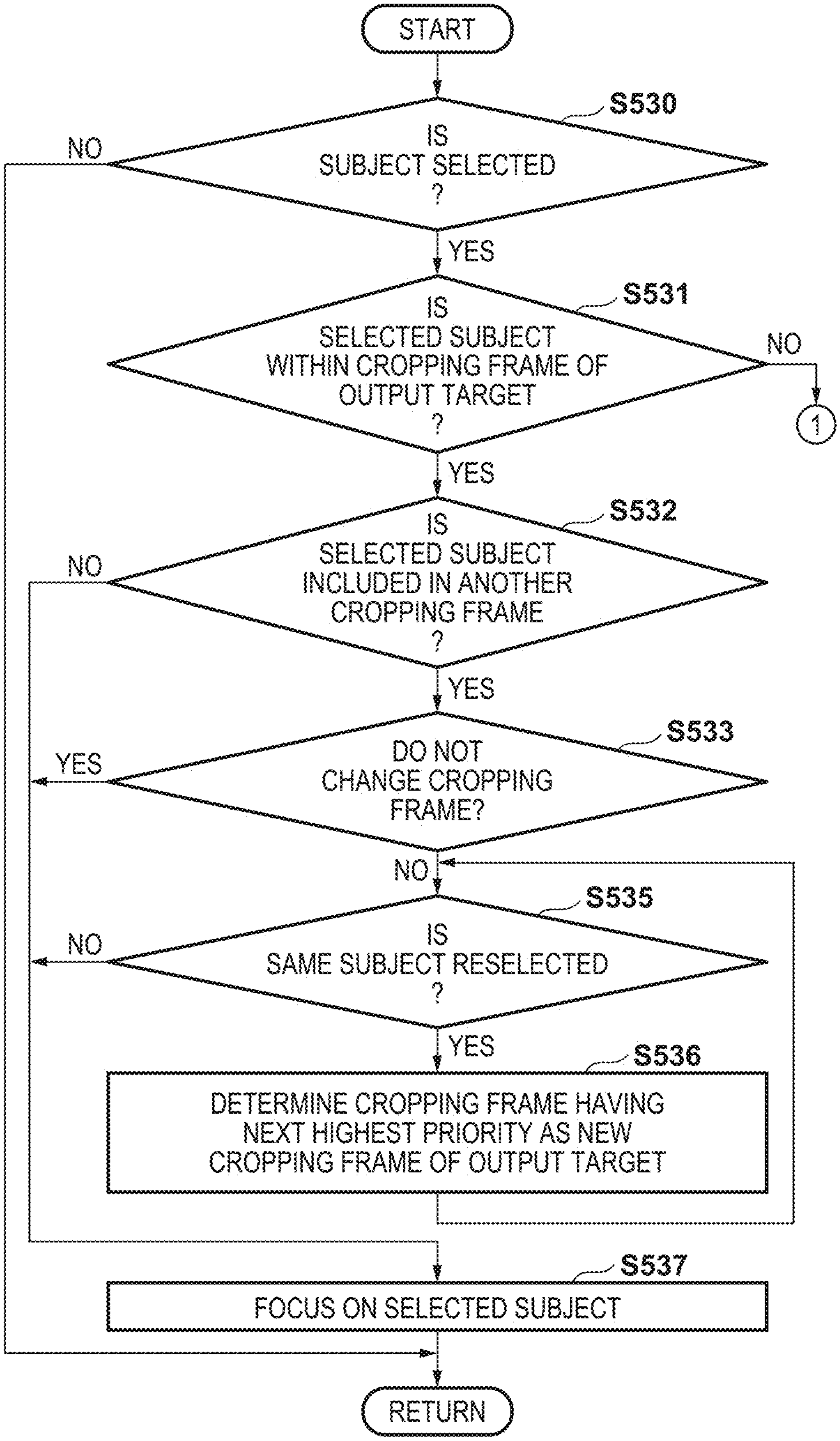
Figures 2, 5C:
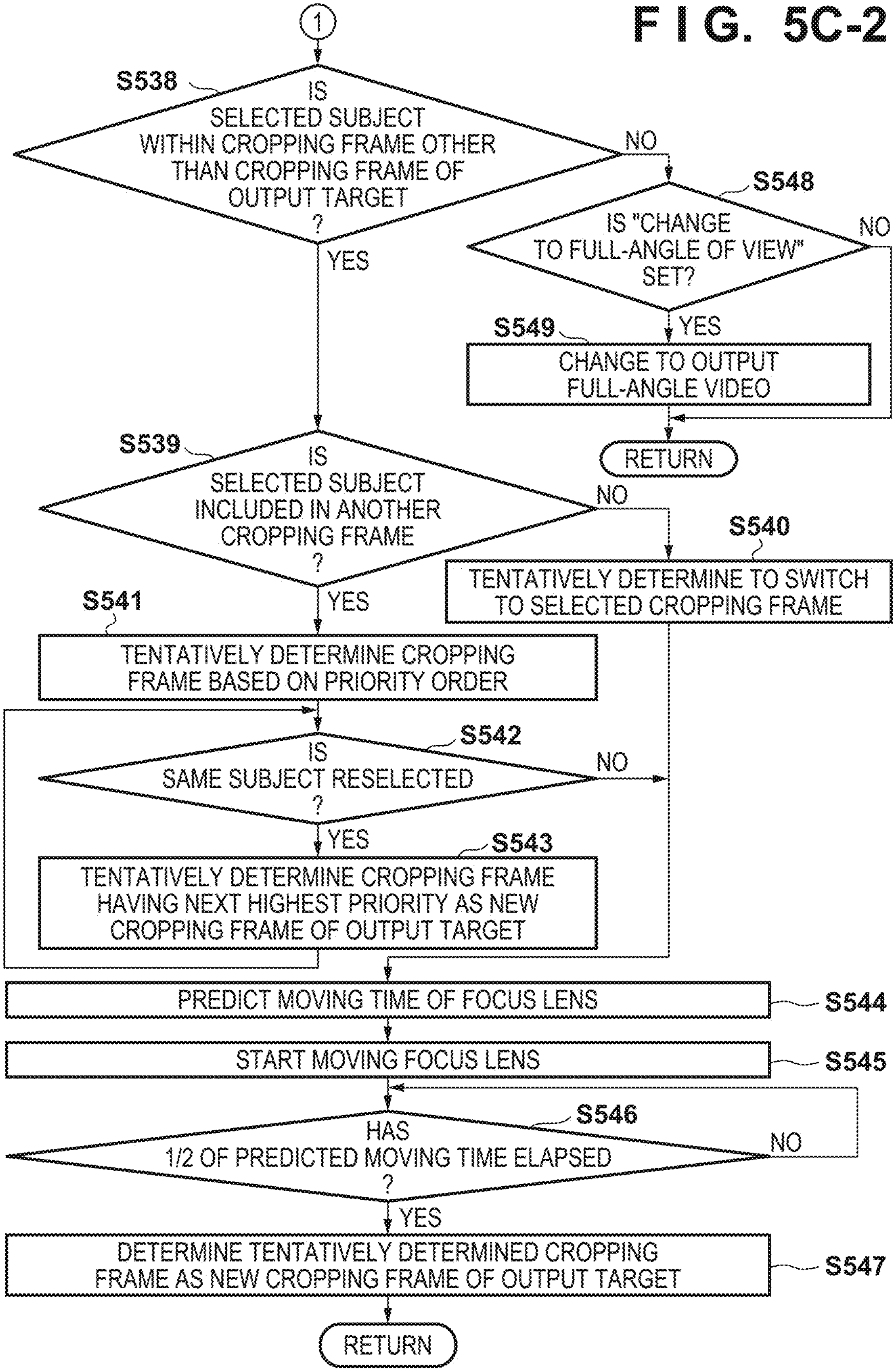

FIGS. 5C-1 and 5C-2 illustrate a flowchart of focus control and selection control of a cropping frame of output target performed in step S406 of FIG. 4.

In step S530, it is determined whether a subject is selected. Selection of a subject occurs, for example, when the system control unit 109 detects a tap operation on the subject on a touch panel included in the operation unit 110. If any subject is selected, the process advances to step S531; if no subject is selected, the process returns to the process of FIG. 4.

In step S531, it is determined whether the subject selected in step S530 is within the cropping frame of output target for outputting cropped video. Whether the selected subject exists within the cropping frame of output target can be determined by comparing the coordinates obtained by the selection operation of the subject with the coordinates of the display position of the cropping frame of output target. If the subject is within the cropping frame of output target, the process advances to step S532; if the subject is not within the cropping frame of output target, the process advances to step S538.

In step S532, it is determined whether the subject selected in step S530 is included in the cropping frame of output target and other cropping frame or frames. If the subject is included in the cropping frame of output target and other cropping frame or frames, the process advances to step S533, and if not, the process advances to step S537.

In step S533, the content set by the processes of steps S511 to S514 in FIG. 5A, that is, the content set as "Operation when subject is re-selected" is "Do not change cropping frame" or "Change cropping frame" is read out from the volatile memory 116. Then, it is determined whether "Do not change cropping frame" is set. If "Do not change cropping frame" is set, the process advances to step S537, and if "Do not change cropping frame" is not set, that is, if "Change cropping frame" is set, the process advances to step S535.

In step S535, it is determined whether the same subject as the subject selected in step S530 is reselected within a predetermined period of time since the subject was last selected. If the same subject is not reselected within the predetermined period of time in step S535, the process advances to step S537.

On the other hand, if the same subject is reselected within the predetermined period of time, the process advances to step S536. In step S536, based on the cropping frame priority order set in the processes of steps S507 to S510, a cropping frame having a next highest priority to the priority of the current cropping frame of the output target is determined as a new cropping frame of output target and saved in the volatile memory 116, and the process returns to step S535. Note that if the current cropping frame of output target is the cropping frame with the lowest priority, the cropping frame with the highest priority is determined as the new cropping frame of output target.

In step S537, the lens unit 101 is controlled to focus on the subject selected in step S530, and then the process returns to the process of FIG. 4.

If the subject selected in step S530 is not within the cropping frame of output target, it is determined in step S538 whether the subject selected in step S530 is within a cropping frame other than the cropping frame of output target. If the subject is within a cropping frame other than the cropping frame of output target, the process advances to step S539, and if it is not within the cropping frame other than the cropping frame of output target, the process advances to step S548.

In step S539, it is determined whether the subject selected in step S530 is also included in other cropping frame or frames different from the cropping frame determined in step S538. If it is not included in the other cropping frame or frame, the process advances to step S540, and if it is included in the other cropping frame or frame, the process advances to step S541.

In step S540, the cropping frame including the selected subject is tentatively determined as a new cropping frame of output target and stored in the volatile memory 116, and the process proceeds to step S544.

On the other hand, in step S541, a cropping frame of output target is tentatively determined based on the cropping frame priority order set in steps S507 to S510, and is stored in the volatile memory 116.

Next, in step S542, it is determined whether the same subject as the subject selected in step S530 is reselected within a predetermined period of time since the subject was last selected. If it is determined in step S542 that the same subject is not reselected within the predetermined period of time, the process advances to step S544.

On the other hand, if the same subject is reselected within the predetermined period of time, the process advances to step S543. In step S543, based on the cropping frame priority order set in the processes of steps S507 to S510, a cropping frame having a next highest priority to the priority of the currently tentatively determined cropping frame of the output target is tentatively determined as a new cropping frame of output target and stored in the volatile memory 116, and the process returns to step S542. Note that if the currently tentatively determined cropping frame of output target is the cropping frame with the lowest priority, the cropping frame with the highest priority is tentatively determined as the new cropping frame of output target.

In step S544, the moving time of the focus lens taken to move from the current position to a position at which the subject selected in step S530 will be focused is predicted. The moving time can be predicted, for example, from the distance to a subject that is focused at the current focus lens position, the distance to the subject selected in step S530, and the actuation performance of the lens unit 101. As a simpler method, the average focus moving time in a case of changing the subject in many shooting scenes may be recorded in advance in the nonvolatile memory 117, and may be used as the predicted value.

In step S545, the lens unit 101 is controlled to start moving the focus lens so as to focus on the subject selected in step S530.

In step S546, it is determined whether a predetermined period of time, such as ½ of the moving time predicted in step S544, has elapsed since the focus lens started moving in step S545. Time is measured using a system timer included in the system control unit 109. When ½ of the predicted moving time has elapsed, the process advances to step S547.

In step S547, the cropping frame of output target tentatively determined in step S541 or S543 is determined as a new cropping frame of output target, and is stored in the volatile memory 116, and the process returns to FIG. 4.

In step S548, the content set in the processes of steps S515 to S518, that is, "Do not change" or "Change to full-angle of view" which is the content set for "Operation when point outside cropping frames is selected", is read out from the volatile memory 116. Then, it is determined whether "Change to full-angle of view" is set. If "Change to full-angle of view" is set, the process advances to step S549; if "Change to full-angle of view" is not set, that is, if "Do not change" is set, the process returns to FIG. 4 without changing the cropping frame of output target.

In step S549, the output target is determined to be the full-angle of view and stored in the volatile memory 116, and the process returns to FIG. 4.

As described above, according to the first embodiment, the camera 100 appropriately controls the focus etc. based on the subject selection operation, and at the same time selects the cropping frame that includes the subject as a new cropping area, and video of the new cropping area can be output. Accordingly, it is possible to minimize the time during which video with unstable focus state is output when changing the frame for crop output without forcing the user to perform complex composite operations.

In particular, in the control in steps S544 to S547, by changing the cropping frame of an output target at the timing when, for example, ½ of the predicted moving time of the focus lens has passed, a negative influence of blurring video output at the timing before and after changing the cropping frame can be made as inconspicuous as possible.

Note that in the first embodiment, a case has been described in which focus control is performed based on the selection of a subject, but another control different from focus control may be performed, or multiple types of control may be performed simultaneously. For example, exposure control, white balance control, image processing control, etc. may be performed. In either case, it is possible to appropriately control the functions performed based on the subject selection operation, and at the same time select the cropping frame that includes the subject as a new cropping area and output the video of the cropping area.

Furthermore, even if an undesirable cropping frame is prioritized due to the operation selecting a subject existing in an area where cropping frames overlap, another frame can be quickly selected with a smooth operation by the control of steps S535 to S536 and S542 to S543.

Further, in this embodiment, two cropping frames are displayed at the same time, but the present invention is also applicable to cases where three or more cropping frames are displayed at the same time.

Second Embodiment

Next, a second embodiment of the present invention will be described. In the second embodiment, a switcher that does not perform shooting, and inputs video from the outside and processes the input video will be described.

Figure 7:
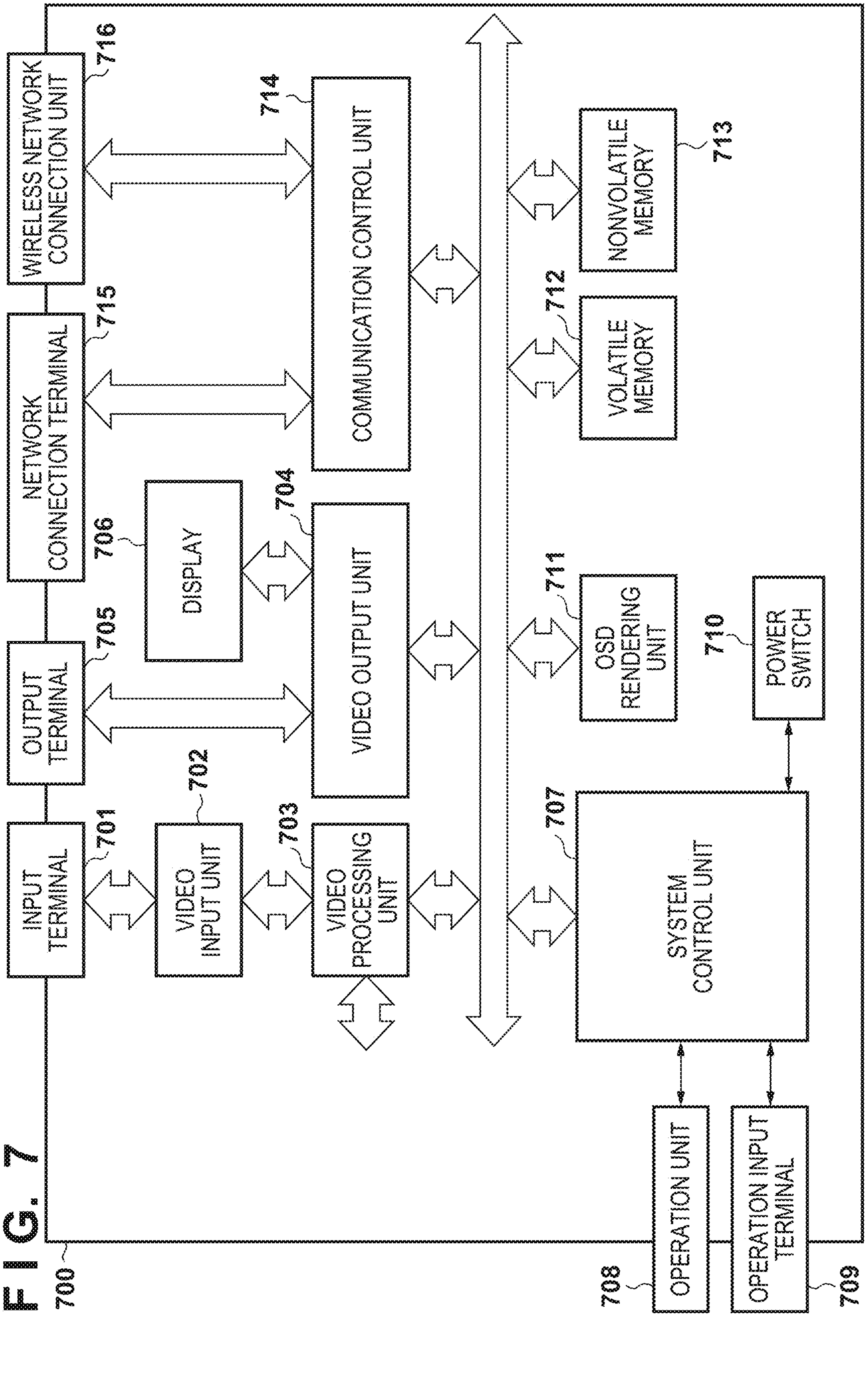
FIG. 7 is a block diagram illustrating a configuration of a switcher according to a second embodiment.

FIG. 7 is a block diagram showing the configuration of a switcher 700 according to the second embodiment.

An input terminal 701 is for inputting video from an external device, and is configured with an HDMI terminal, an SDI terminal, or the like. The input terminal 701 can input a plurality of videos simultaneously.

A video input unit 702 can input at least two or more streams of video signals from the outside via the input terminal 701.

A video processing unit 703 receives video data from the video input unit 702 at a predetermined frame rate, and performs predetermined resizing processing, trimming processing, color conversion processing, and distortion correction processing. A volatile memory 712 is then used as a VRAM to store the processed video data.

An OSD rendering unit 711 renders character strings and icons representing the status and settings of the switcher 700, and a menu screen to the VRAM of the volatile memory 712. Characters and icons are stored in a non-volatile memory 713, and the OSD rendering unit 711 reads them out and renders them to the VRAM.

A video output unit 704 reads out the video data recorded in the volatile memory 712 and the data rendered by the OSD rendering unit 711 as necessary, selects or combines them, and outputs the resultant data to an output terminal 705, display 706, and communication control unit 714. The video output unit 704 also has a role of converting the accompanying information received from a system control unit 707 into metadata and outputting it to the output terminal 705 together with the video. Metadata can be linked to video data for each frame, and can express accompanying information for each frame, such as a time code.

The output terminal 705 is for outputting video to an external device, and can output a video signal to an external monitor or recording device connected via an HDMI cable, SDI cable, and so forth (not shown). The metadata output from the video output unit 704 can also be output to external devices via the respective cables.

The display 706 is configured with, for example, an LCD panel, and its display content is controlled by the video output unit 704. The display 706 is mainly used for simultaneously displaying a plurality of videos stored in the VRAM of the volatile memory 712 for monitoring them.

The system control unit 707 controls the entire switcher 700. By reading out and executing programs recorded in the non-volatile memory 713, the system control unit 707 controls each constituent and realizes each operation of this embodiment. The system control unit 707 may include multiple CPU cores. In that case, the tasks described in the program can be shared and processed by the multiple CPU cores.

An operation unit 708 includes a menu key, a cross key, a touch panel, and so forth for operating a menu screen and selecting video to be output from the output terminal 705 on the video displayed on the display 706.

An operation input terminal 709 is used to control the switcher 700 from an external controller, and notifies the system control unit 707 of a control signal via the operation input terminal 709. By the system control unit 707 detecting the content of the operation of the external controller based on the control signal, it is possible to realize substantially the same operations by using the external controller as those by using the operation unit 708.

A power switch 710 is for selecting the power state of the switcher 700, and depending on the position of the switch, determines whether the power is on or off, and notifies the system control unit 707 of the detected power state.

The volatile memory 712 is used as a dynamic memory area for video data handled by each of the video processing unit 703, video output unit 704, and OSD rendering unit 711, and for programs used by the system control unit 707. Further, the volatile memory 712 has a storage capacity sufficient to store moving images for a predetermined period of time.

The non-volatile memory 713 is a memory that can be electrically erased and recorded, such as an EEPROM. In the non-volatile memory 713, constants, programs, and so on, used for the operation of the system control unit 707 are recorded. The program here includes a program for executing processing shown in a flowchart described later in this embodiment.

The communication control unit 714 is used to communicate with external devices. By using either or both of a network connection terminal 715 and a wireless network connection unit 716, wireless/wired IP communication is possible. The communication control unit 714 enables monitoring of video via IP communication by transmitting the video from the video output unit 704 to an external device. Further, by receiving a control signal generated by an operation of an external controller, an operation request corresponding to an operation executable by the operation unit 708 can be notified to the system control unit 707. Alternatively, a setting change request for directly changing setting items on a menu screen displayed on the display 706 can be received and the system control unit 707 can be notified of it.

The network connection terminal 715 is for the communication control unit 714 to perform wired network communication, and the wireless network connection unit 716 is for the communication control unit 714 to perform wireless network communication. The wireless network connection unit 716 may be configured to connect a detachable antenna such as a WiFi dongle via a socket (not shown) or the like.

Figure 8:
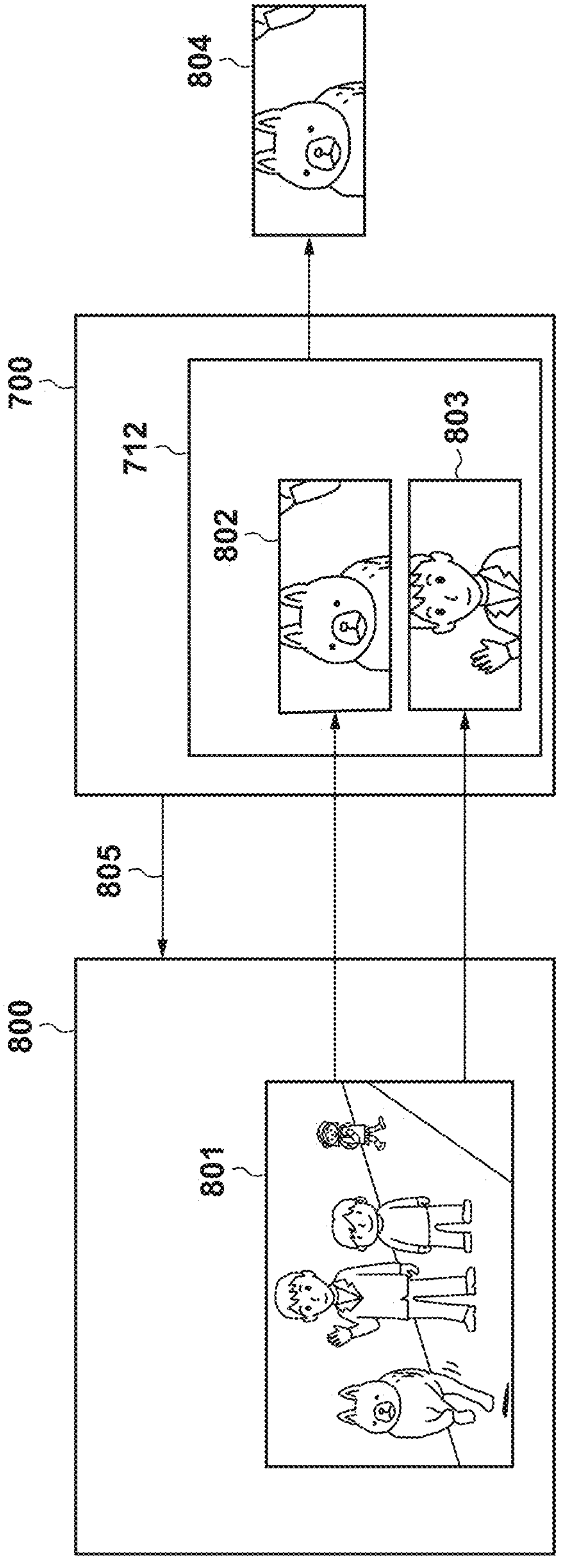
FIG. 8 is a conceptual diagram illustrating an operation of the switcher in the second embodiment.

FIG. 8 is a diagram illustrating an example of video data captured by an external camera and video data handled by the switcher 700 in a case where the switcher 700 receives a plurality of cropped videos and selects a subject.

Reference numeral 800 represents an external camera, which has a configuration capable of generating a plurality of cropped videos from captured full-angle video and simultaneously transmitting them to the switcher 700. Reference numeral 801 indicates full-angle video data taken by the camera 800 before cropping.

Reference numeral 802 indicates an example of cropped video A output from the camera 800 and input to the switcher 700, which is composed of a video range obtained by cropping a partial area of the full-angle video data 801 in the camera 800.

Reference numeral 803 indicates an example of cropped video B output from the camera 800 and input to the switcher 700, which is composed of a video range obtained by cropping a partial area, different from that of the cropped video A 802, of the full-angle video data 801 in the camera 800.

Reference numeral 804 indicates an example of a video that the switcher 700 outputs from the output terminal 705, and is generated based on at least one of the cropped video A 802 and the cropped video B 803.

Reference numeral 805 indicates selection information of video data, and includes, for example, coordinate information of a subject selected in the received cropped video A 802 or cropped video B 803.

Figure 9:
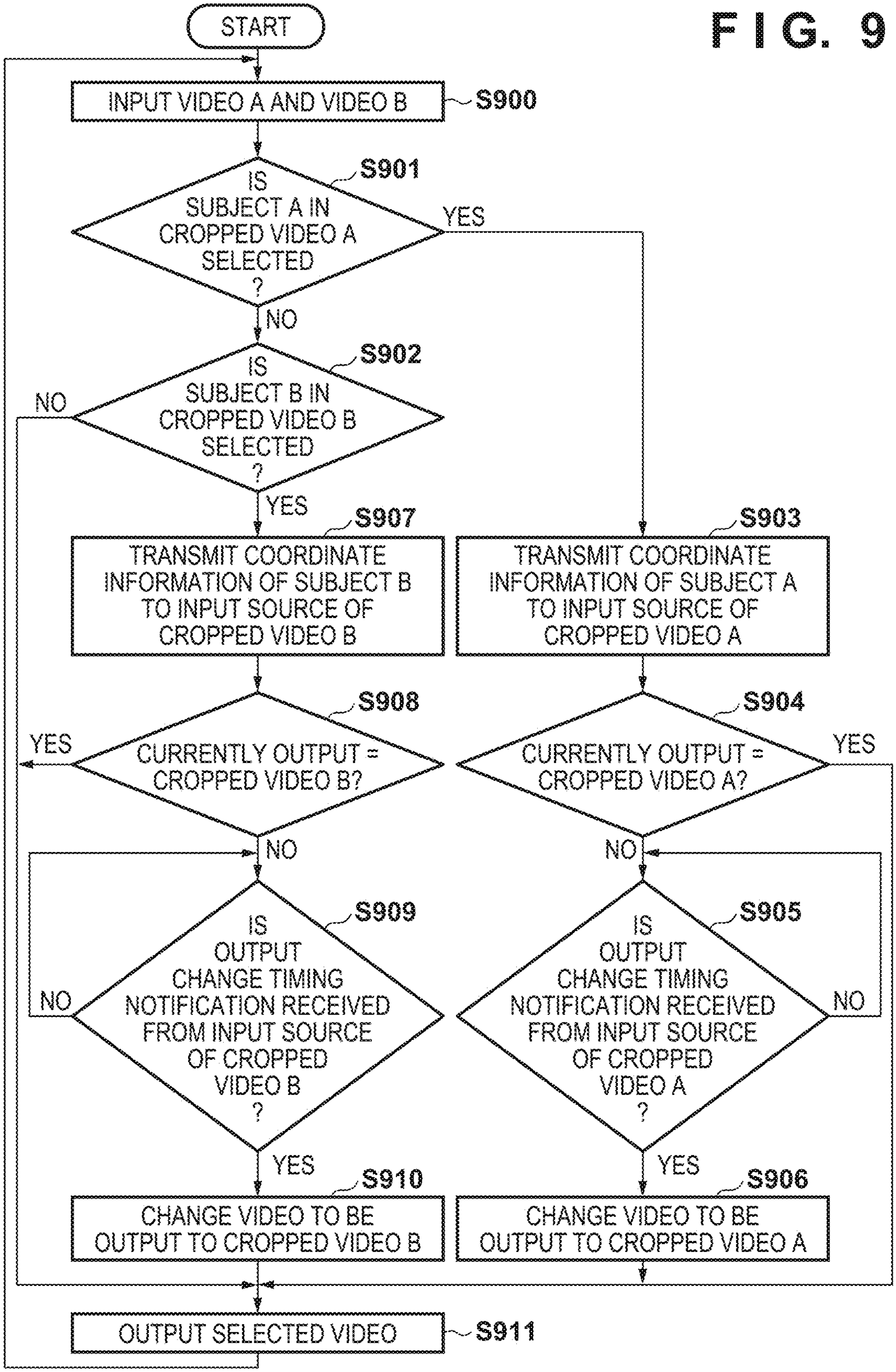
FIG. 9 is a flowchart illustrating an operation of the switcher in the second embodiment.

FIG. 9 is a flowchart showing an example of the operation of the switcher 700 according to this embodiment. The processing shown in this flowchart is realized by the system control unit 707 controlling each part of the switcher 700 based on a program stored in the non-volatile memory 713. Further, the user operation that occurs in the processing shown in this flowchart occurs when the system control unit 707 detects the operation performed by the user on the operation unit 708. Alternatively, it may occur by the system control unit 707 detecting a control signal received from an external controller via the operation input terminal 709 or the communication control unit 714.

When the processing is started, the cropped video A 802 and the cropped video B 803 are input from the input terminal 701 via the video input unit 107 in step S900.

Next, in step S901, it is determined whether a subject A included in the cropped video A 802 is selected. Selection of the subject A occurs when the system control unit 707 detects a tap operation on the subject, for example on a touch panel included in the operation unit 708. If the subject A is selected, the process advances to step S903; if not, the process advances to step S902.

In step S902, it is determined whether a subject B included in the cropped video B 803 is selected. If the subject B is selected, the process advances to step S907; if not, the process advances to step S911.

In step S903, the coordinate information of the subject A obtained by the selection operation of the subject A is transmitted to the input source of the cropped video A 802 via the network connection terminal 715 or the wireless network connection unit 716.

In step S904, it is determined whether the video currently being output from the output terminal 705 is the cropped video A 802. If the cropped video A 802 is the video currently being output, the process advances to step S911, and if the cropped video A 802 is not the video currently being output, the process advances to step S905.

In step S905, it is determined whether an output change timing notification is received from the input source of the cropped video A 802, and if the output change timing notification is received from the input source of the cropped video A 802, the process advances to step S906.

In step S906, the video output from the output terminal 705 is changed to the cropped video A 802, and the information indicating that the cropped video A 802 is selected is stored in the volatile memory 712, then the process advances to step S911.

In step S907, the coordinate information of the subject B obtained by the selection operation of the subject B is transmitted to the input source of the cropped video B 803 via the network connection terminal 715 or the wireless network connection unit 716.

In step S908, it is determined whether the video currently being output from the output terminal 705 is the cropped video B 803. If the cropped video B 803 is the video currently being output, the process advances to step S911, and if the cropped video B 803 is not the video currently being output, the process advances to step S909.

In step S909, it is determined whether an output change timing notification is received from the input source of the cropped video B 803, and if the output change timing notification is received from the input source of the cropped video B 803, the process advances to step S910.

In step S910, the video output from the output terminal 705 is changed to the cropped video B 803, and the information indicating that the cropped video B 803 is selected is stored in the volatile memory 712, then the process advances to step S911.

In step S911, either the cropped video A 802 or the cropped video B 803 is output from the output terminal 705 based on the information stored in the volatile memory 712 in step S906 or S910.

As described above, according to the second embodiment, the switcher 700 notifies the coordinate information of a subject to a single camera that is the input source of a plurality of cropped videos, and selects an input video containing the subject as a new output target, thereby outputs the selected video. Therefore, the camera that receives the notification of the subject selection information can appropriately control focus, and so forth, based on the notification, and when changing the partial area to be cropped, the time during which videos with unstable focus are output can be minimized without forcing the user to perform complex compound operations.

Further, according to the second embodiment, in a system in which a camera that controls focus, and so forth, and a switcher that selects a priority area are configured as separate units, the aforesaid effects can be achieved without performing each operation on each device.

In particular, by changing the cropping frame to be output at the output change timing notified from the input source camera based on the control in steps S905 and S909, a negative influence of blurring video output at the timing before and after changing the cropping frame can be made as inconspicuous as possible.

Note that in this embodiment, two streams are exemplified for inputting cropped videos at the same time, but the present invention is also applicable to the case where three or more cropped videos are input at the same time.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-080364, filed May 15, 2023 which is hereby incorporated by reference herein in its entirety.

What is claimed is:

1. A video output apparatus comprising one or more processors and/or circuitry which function as:

a setting unit that is capable of setting a plurality of frames each indicative of partial video which is a part of input video;

a selection unit that selects a subject according to an operation performed on the input video;

an output unit that outputs video; and a control unit that performs at least focus control corresponding to the subject selected by the selection unit and that controls selection of a frame to be output by the output unit while performing the focus control, wherein, in a case where the subject is selected under a state in which the plurality of frames are set, the setting unit sets a priority order of the plurality of frames according to a predetermined method, and wherein, in a case where the subject is selected under a state in which a plurality of frames are set, the control unit determines, from among the plurality of set frames, a frame including the selected subject as the frame indicative of a partial video to be output, and if the selected subject is included in two or more of the plurality of frames, the control unit determines a frame with a highest priority among the two or more of the plurality of frames as the frame indicative of the partial video to be output, and the output unit outputs partial video of the determined frame.

2. The video output apparatus according to claim 1 further comprising a display control unit that superimposes the frame or frames on the video, and displays superimposed video on display means.

3. The video output apparatus according to claim 1, wherein the control unit further performs at least one of, exposure control, white balance control, and image processing control.

4. The video output apparatus according to claim 1, wherein the predetermined method is one of a method of determining the priority order based on numbers given in advance to the plurality of frames, a method of determining the priority order based on a history of output partial video of the plurality of frames, and a method of determining the priority order based on distances from a center of the video to the plurality of frames.

5. The video output apparatus according to claim 1, wherein the predetermined method can be selected from a plurality of predetermined methods.

6. The video output apparatus according to claim 1, wherein in a case where a same subject is selected within a predetermined period of time since the subject was last selected, the output unit changes the partial video of the frame to be output in the descending order of the priority order of the frames.

7. The video output apparatus according to claim 1, wherein in a case where a same subject is selected within a predetermined period of time since the subject was last selected, whether to change or not to change the partial video of the frame output by the output unit can be selected.

8. The video output apparatus according to claim 1, wherein in a case where the subject is not included in any of the frames, the output unit does not change the partial video of the frame currently being output.

9. The video output apparatus according to claim 1, wherein in a case where the subject is not included in any of the frames, the output unit outputs the video.

10. The video output apparatus according to claim 1, wherein in a case where the subject is not included in any of the frames, not to change the frame or to output the video can be selected.

11. The video output apparatus according to claim 1, wherein in a case where a frame of a partial video to be output by the output unit is changed from a first frame to a second frame, the output unit switches from a partial video of the first frame to a partial video of the second frame at a predetermined timing between start and end of the control by the control unit.

12. A video output apparatus comprising one or more processors and/or circuitry which function as:

a display control unit concurrently that displays, on a display unit, a plurality of input videos that are supplied from at least one external imaging apparatus;

a selection unit that, in response to an operation performed on any one of the plurality of input videos, selects a subject included in the operated input video and obtains position information of the selected subject in the input videos;

a notifying unit that transmits, via a communication interface, the position information of the selected subject to the external imaging apparatus that has supplied the operated input video; and an output unit that, based on a notification from the selection unit, selects the input video including the selected subject as an output video and outputs the selected input video.

13. The video output apparatus according to claim 12, wherein in a case where the video to be output from the output unit is changed from a first video to a second video, a timing to switch to the second video is received from the external imaging apparatus of the second video, and the output unit changes from the first video to the second video according to the timing.

14. A video output method comprising:

setting at least one frame indicative of partial video which is a part of input video;

selecting a subject according to an operation performed on the input video;

outputting video; and performing at least focus control corresponding to the subject selected and that controls selection of a frame to be output by the output unit while performing the focus control, wherein in a case where the subject is selected under a state in which the plurality of frames are set, setting a priority order of the plurality of frames according to a predetermined method, and wherein, in a case where the subject is selected under a state in which a plurality of frames are set determining, from among the plurality of set frames, a frame including the selected subject as the frame indicative of a partial video to be output, and if the selected subject is included in two or more of the plurality of frames, determining a frame with a highest priority among the two or more of the plurality of frames as the frame indicative of the partial video to be output, and outputting, partial video of the determined frame.

15. A video output method comprising:

concurrently displaying, on a display unit, a plurality of input videos that are supplied from at least one external imaging apparatus;

selecting, in response to an operation performed on any one of the plurality of input videos, a subject included in the operated input video and obtains position information of the selected subject in the input videos;

transmitting, via a communication interface, the position information of the selected subject to the external imaging apparatus that has supplied the operated input video; and selecting, based on a notification from the selection unit, the input video including the selected subject as an output video and outputs the selected input video.

16. A non-transitory computer-readable storage medium, the storage medium storing a program that is executable by the computer, wherein the program includes program code for causing the computer to function as a video output apparatus comprising:

a setting unit that is capable of setting a plurality of frames each indicative of partial video which is a part of input video;

a selection unit that selects a subject according to an operation performed on the input video;

an output unit that outputs video; and a control unit that performs at least focus control corresponding to the subject selected by the selection unit and that controls selection of a frame to be output by the output unit while performing the focus control, wherein, in a case where the subject is selected under a state in which the plurality of frames are set, the setting unit sets a priority order of the plurality of frames according to a predetermined method, and wherein, in a case where the subject is selected under a state in which a plurality of frames are set, the control unit determines, from among the plurality of set frames, a frame including the selected subject as the frame indicative of a partial video to be output, and if the selected subject is included in two or more of the plurality of frames, the control unit determines a frame with a highest priority among the two or more of the plurality of frames as the frame indicative of the partial video to be output, and the output unit outputs partial video of the determined frame.

17. A non-transitory computer-readable storage medium, the storage medium storing a program that is executable by the computer, wherein the program includes program code for causing the computer to function as a video output apparatus comprising:

a display control unit that concurrently displays, on a display unit, a plurality of input videos that are supplied from at least one external imaging apparatus;

a selection unit that, in response to an operation performed on any one of the plurality of input videos, selects a subject included in the operated input video and obtains position information of the selected subject in the input videos;

a notifying unit that transmits, via a communication interface, the position information of the selected subject to the external imaging apparatus that has supplied the operated input video; and an output unit that, based on a notification from the selection unit, selects the input video including the selected subject as an output video and outputs the selected input video.

* * * * *